UNITED STATES PATENT OFFICE.

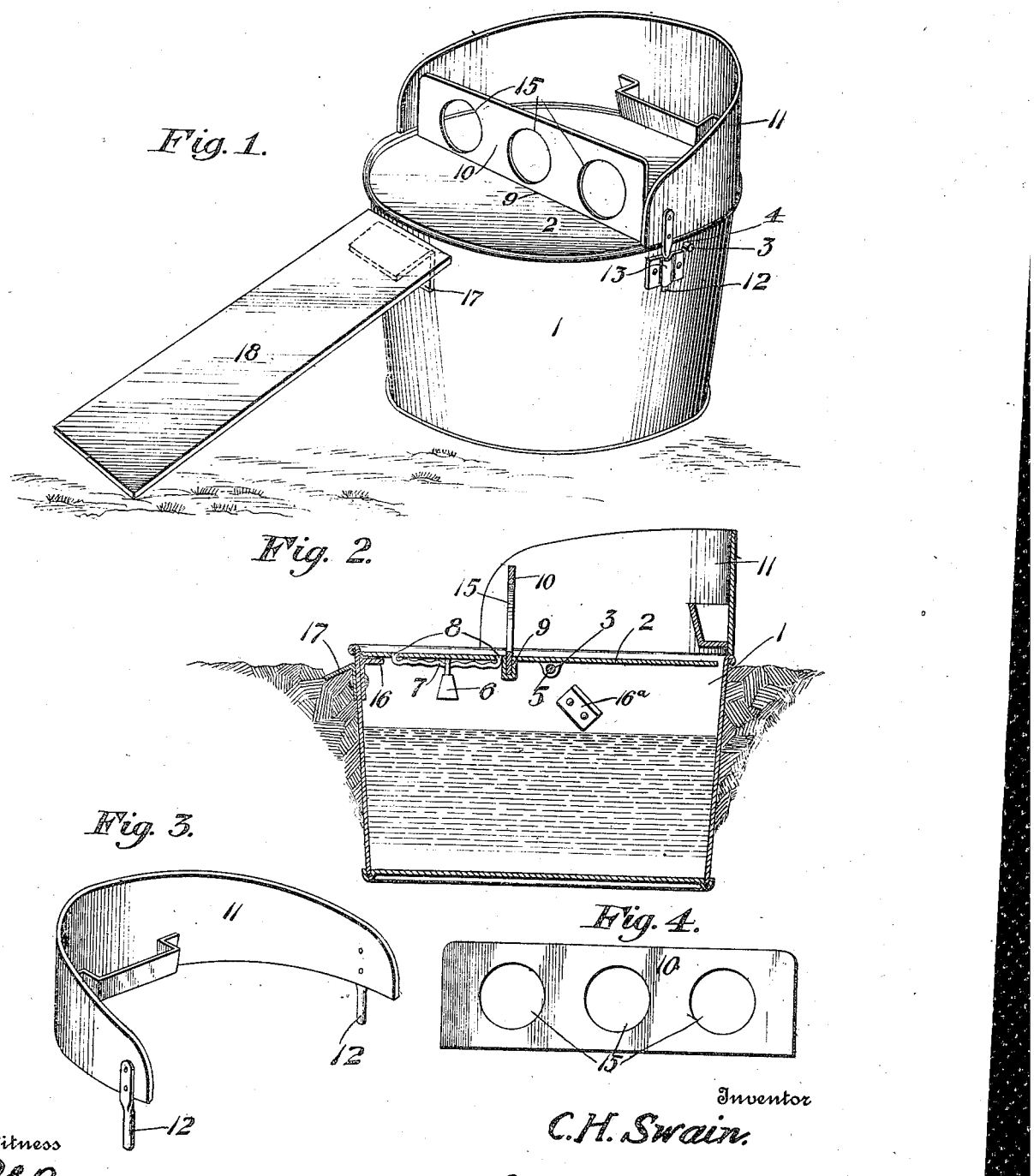

CHARLES H. SWAIN, OF WHELEN SPRINGS, ARKANSAS.

TRAP.

1,258,960.  Specification of Letters Patent.  Patented Mar. 12, 1918.

Application filed October 28, 1916. Serial No. 128,263.

*To all whom it may concern:*

Be it known that I, CHARLES H. SWAIN, a citizen of the United States, residing at Whelen Springs, in the county of Clark and State of Arkansas, have invented new and useful Improvements in Traps, of which the following is a specification.

This invention relates to traps, and especially to traps used in catching rats, mice or other fur-bearing animals.

The object of the invention is to provide a device especially adapted for catching rats or mice in plague infected districts, the said device in addition exterminating flees or other germ carrying insects commonly found on such animals.

With the above objects in view, the invention consists of a receptacle adapted to be partially filled with liquid, the liquid being of such nature as to cause the death of fleas or other germ carrying insects.

The invention further consists of a hinged top for the receptacle, vertical flanges entirely surrounding the downwardly tilting portion of the said top and means for removing the tilting top and flanges in order that the device may be conveniently packed.

In the drawings:

Figure 1 is a perspective view of the trap as used upon the surface of the ground;

Fig. 2 is a central vertical sectional view of the trap showing the receptacle buried so that the top will be practically even with the surface of the ground;

Fig. 3 is a detail view of the semi-circular flanged member detached; and

Fig. 4 is a view of the vertical flanged member carried by the lid.

Referring more specifically to the drawings, wherein like characters of reference denote corresponding parts, the receptacle is shown at 1. This preferably consists of a cylindrical vessel adapted to be partially filled with a liquid for the purpose of drowning the animal, the said liquid having therein a small quantity of kerosene or other fluid adapted to kill fleas or other insects. The receptacle 1 is provided with a tilting lid 2, the hinge for said lid comprising a rod 3 passing through bearings 4 in the receptacle 1. Suitable ears 5 are formed upon the under side of the lid for the purpose of receiving the rod 3. In order that the lid may be normally closed on the receptacle, there is provided upon its under surface a weight 6. A rod 7 having its ends secured to the under surface of the lid, as shown at 8, provides means for adjusting the weight so as to regulate the tilting of the lid 2. Formed in the top of this lid is a groove 9, the said groove being adapted to receive an upright flange 10 slidable therein. This construction enables the said flange 10 to be removed from the lid 2 for packing purposes.

Partially surrounding the top of the receptacle 1 is a vertical flanged member 11. This member is removably secured to the receptacle by means of pins 12 carried by the said flange, and sockets 13 carried by the said receptacle. A suitable trough is secured within the flanged member 11 to provide a convenient means for baiting the trap.

It will be seen from the drawings that the flanges just described entirely surround the downwardly tilting portion of the lid 2 so that a rat or other animal will be compelled to jump upon this downwardly tilting portion, which positively insures the operation of the trap.

If desired, small apertures 15 may be formed in the flange 10 to provide means for mice passing therethrough, the flange being of such height as to probably conceal the bait from these small animals. Located within the receptacle is a lug 16 which forms a stop for the lid 2 to limit the movement of the lid caused by the weight 5. The stop 16$^a$ also within the receptacle provides means for limiting the downward movement of the said lid.

As before stated, the trap is adapted for use either upon the surface of the ground or partially concealed therein.

In order that animals may find a ready means for entering the trap, the receptacle is provided with a lug 17 upon its outside for the purpose of securing an inclined board 18 or other member, to enable the animal to walk up to the tilting lid.

From the foregoing it will be seen that the trap provides a simple and effective means for catching rats or other fur-bearing animals, and at the same time provides means for exterminating insects which these animals carry. The trap is also constructed in such a way as to be perfectly safe for children, there being no means for injuring them in any way. Various changes in the form and proportion of the invention may be made as will properly fall within the scope of the appended claims.

Having thus described my invention, I claim:

1. An animal trap comprising a receptacle, a tilting platform mounted thereon, a vertical flange disposed transversely upon said platform and a removable flange carried by the receptacle and partly surrounding the downwardly tilting portion of the platform, said flanges combining to form a wall entirely surrounding that portion of the platform which descends.

2. An animal trap comprising a receptacle, a platform hinged thereto and having a transversely disposed groove therein, a flange removably fitted within said groove and a flange removably secured to said receptacle and partly surrounding that portion of the platform which descends.

In testimony whereof I affix my signature.

CHARLES H. SWAIN.